July 13, 1965   F. WHEELER ETAL   3,194,595
SAFETY DEVICE FOR COWLING LATCH
Filed Aug. 21, 1962   2 Sheets-Sheet 1
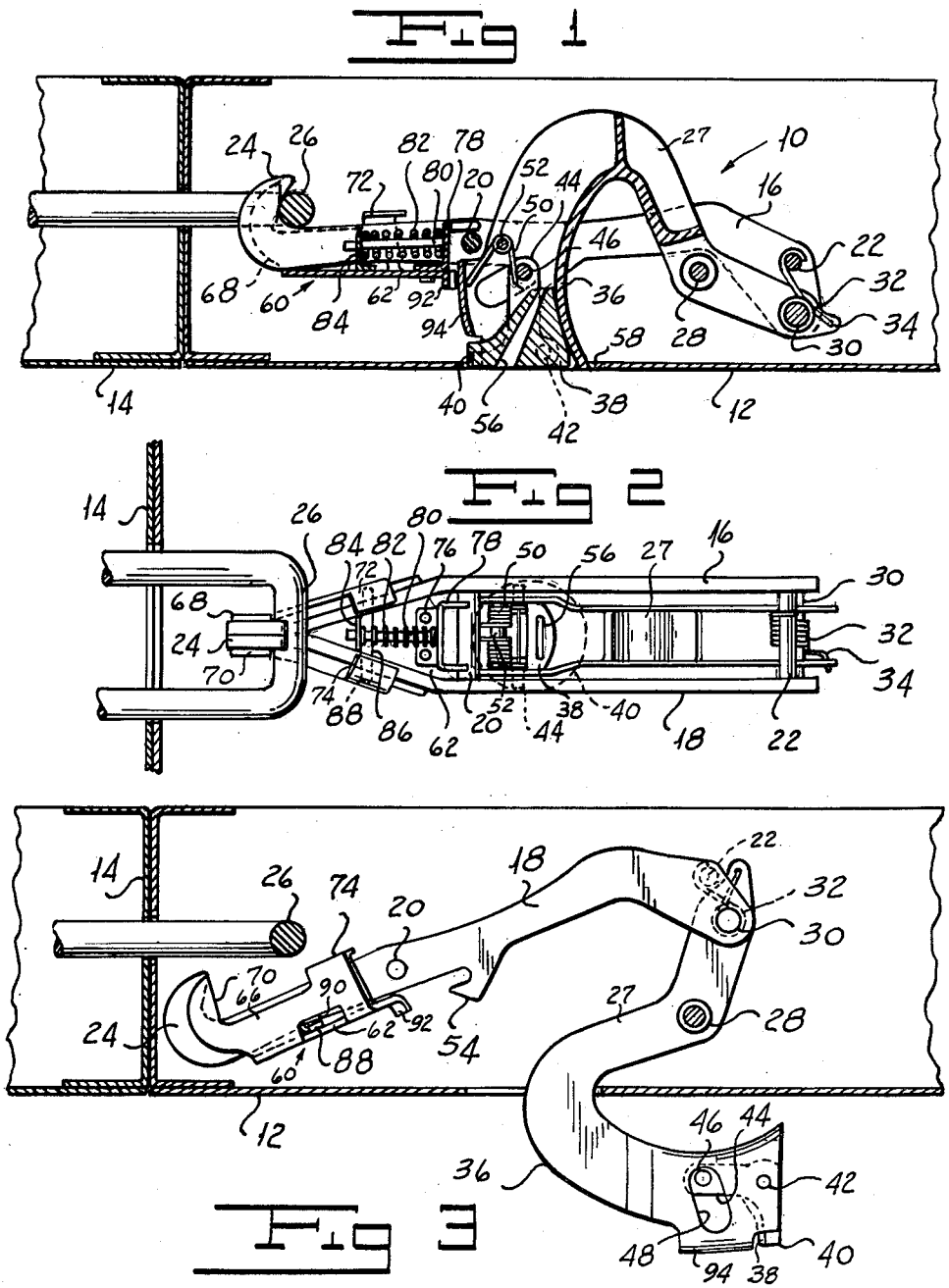
INVENTORS
FRANK WHEELER
BENJAMIN CARL BEEHNER
BY
Shenier & O'Connor
ATTORNEYS

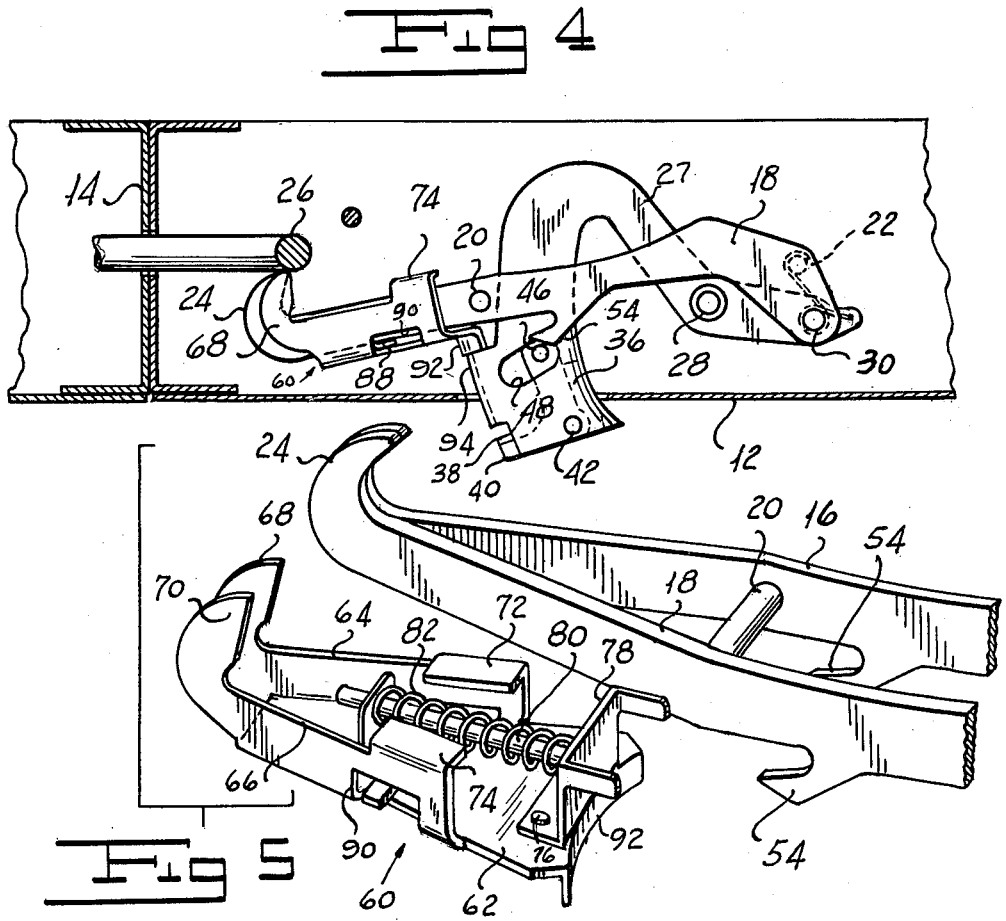
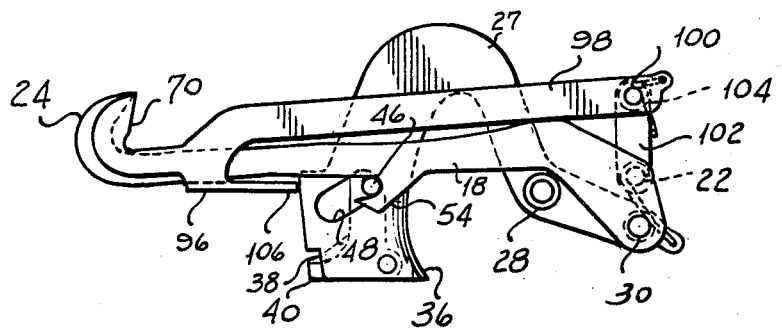

3,194,595
SAFETY DEVICE FOR COWLING LATCH
Frank Wheeler, Little Falls, N.J., and Benjamin Carl Beehner, Van Nuys, Calif., assignors to Camloc Fastener Corporation, Paramus, N.J., a corporation of New York
Filed Aug. 21, 1962, Ser. No. 218,313
4 Claims. (Cl. 292—113)

Our invention relates to a safety device for a cowling latch and more particularly to a device for preventing a latching mechanism from being locked in its latching position when the latch hook is not actually in engagement with the hook receptacle or eye.

One particular type of latch mechanism known in the prior art is employed for securing a separable member such, for example, as a cowling to the body of an aircraft. In order to minimize air drag the operating parts of the mechanism are disposed within the skin of the aircraft which has a small hole therein to permit access to the actuatable parts of the mechanism. It will be apparent that since the parts are disposed within the aircraft skin, the latch hook and the eye or other receptacle for the hook are not visible from outside the craft.

In a specific form of the type latch described above the latch actuator is adapted to be moved from outside the craft to position the hook to be drawn into engagement with the eye. From this position, upon further movement of the actuator the hook is drawn firmly into engagement with the eye and a locking mechanism snaps into place to hold the latch in its latching position.

It has occurred in use of the specific form of latch described above that when the actuator is operated in an attempt to move the latch into the position at which the hook engages the eye the parts are so disposed that the end of the outside of the hook engages the eye. When this occurs, further movement of the actuator moves the latch in a direction which normally would cause the hook to draw on the eye and finally will cause the locking mechanism to operate. Thus the latch is thought to be in engagement with the eye whereas in fact the parts are out of engagement.

Owing to the fact that the parts are not visible from outside the aircraft the operator cannot see that the latch is not functioning correctly. The danger of this situation will readily be apparent. The separable part may fall from the aircraft in flight.

We have invented a safety device which overcomes the defect of latch mechanisms of the type described hereinabove. Our safety device prevents the latch from being locked in a position at which the eye is not acutally engaged by the hook. Our safety device ensures certain operation of concealed latches. Our safety device is extremely simple in its construction and operation. It may readily be applied to already existing latches.

One object of our invention is to provide a safety device for a cowling latch and the like which prevents the latch from being locked in an inoperative postiion.

Another object of our invention is to provide a safety device which makes certain of the proper operation of a cowling latch or the like.

A further object of our invention is to provide a safety device for permitting sure operation of latches the operating parts of which are not visible to the operator.

A still further object of our invention is the provision of a safety device for a cowling latch which device is extremely simple in its construction and operation.

Yet another object of our invention is to provide a safety device for a cowling latch which can readily be applied to already existing latches.

Other and further objects of our invention will appear from the following description:

In general our invention contemplates the provision of a safety device for a cowling latch including a member normally positioned to prevent movement of the latch actuator to its locked position. This member is moved against the action of a biasing means out of the path of the actuator only when the latch hook is so positioned that it properly draws against the receptacle as the actuator moves towards its locked position.

In the accompanying drawings which form part of the instant specification and which are to be read in conjunction therewith and in which like reference numerals are used to indicate like parts in the various views:

FIGURE 1 is a sectional view of a cowling latch provided with our safety device.

FIGURE 2 is a top plan of the cowling latch provided with our safety device.

FIGURE 3 is a side elevation of a cowling latch provided with our safety device and shown in its released position.

FIGURE 4 is a side elevation of a cowling latch provided with out safety device and illustrating the operation of the asfety device in preventing the latch from being moved to its locked position.

FIGURE 5 is a fragmentary exploded view of a cowling latch provided with our safety device.

FIGURE 6 is a side elevation of an alternate form of our cowling latch safety device.

Referring now to FIGURES 1 to 4 of the drawings the cowling latch with which our safety device is associated includes a latching assembly indicated generally by the reference character 10 carried by a separable member 12 adapted to be secured to the frame 14 of an aircraft or the like. The assembly 10 includes a latch having sides 16 and 18 connected at a point intermediate their ends by a pin 20 and at their outer ends by a pin 22. We bend the ends of the sides 16 and 18 remote from pin 22 together and form this end of the latch with a hook 24. In the operative position the latch hook 24 is adapted to engage a receptacle such as an eye 26 secured to the frame 14.

The assembly 10 includes an actuator 27 pivotally supported on a pin 28 carried by the member 12. A pin 30 pivotally connects the legs 16 and 18 to the actuator 27. A coil spring 32 has one end wound around the pin 22 and has its other end disposed in a hole 34 in the end of actuator 27. This spring normally urges the actuator 27 toward the position shown in FIGURE 3.

We form actuator 27 with a handle portion 36 which, when the latch is released as shown in FIGURE 3, is adapted to be moved by the operator to operate the latch. The end of handle 36 is provided with a pin 42 carrying a socket 38 straddled by a catch 40 also carried by the pin 42. A pair of ears 44 on the catch 40 support a pin 46 the ends of which extend out through slots 48 in the wall of the handle. A spring 50 carried by a pin 52 in the handle 36 bears between the wall of the handle and the central portion of the pin 46 normally to urge the catch 40 to the position shown in FIGURE 1. We form the sides 16 and 18 of the drawlatch with respective hooks 54. With the parts in the locked position shown in FIGURE 1 of the drawings the ends of pin 46 engage the hooks 54. The socket 38 has a recess 56 for the reception of a tool such as a screwdriver or the like for actuating the catch to release the latch in a manner to be described.

From the structure thus far described the operation of the cowling latch will readily be apparent. With the parts in the locked position shown in FIGURE 1 hook 24 is in engagement with eye 26 to draw the parts 12 and 14 firmly together. At the same time the ends of the pin 46 which extend through the slots 48 in the handle wall are in engagement with the hooks 54 on the draw latch sides 16 and 18. At this time the surface of catch 40 is flush with the skin of the member 12. If now the operator wishes to remove the part 12 he inserts the end of a tool such as a screwdriver in the catch recess 56 and pivots the socket and catch in a counterclockwise direction as viewed in FIGURE 1 to move the ends of roll pin 46 out of engagement with the hooks 54. This operation is performed against the action of spring 50. When this has been done, handle 36 can be moved out through the skin opening 58 to the position shown in FIGURE 3. In the course of this operation the actuator 27 pivots in a counterclockwise direction around pin 28 and the latch hook 24 moves to the left and downwardly to a position at which it is out of engagement with hook 26. In this relative position of the parts the member 12 is freed and handle 36 is positioned to permit it to be moved by the operator when relatching takes place.

When the operator wishes to replace the part 12 on the frame 14 he moves the parts into abutting relationship and pushes the handle 36 from the position shown in FIGURE 3 into the opening 58. In the course of this operation actuator 27 pivots in a clockwise direction as viewed in FIGURES 1 and 3. Owing to the connection between the sides 16 and 18 and actuator 27 this operation should first move hook 24 to a position at which eye 26 is in engagement with the hook recess and then to a position at which it draws the parts firmly together.

In operation of the latch it can happen that upon movement of handle 36 into the opening 58 hook 24 will not be properly positioned but its end may engage the underside of the eye 26 as shown in FIGURE 4, for example. When this occurs continued movement of the handle into the opening 58 will cause the ends of pin 46 to ride over the hooks 54 to hold the parts in a locked position although the hook 24 is not in engagement with the eye 26. Not only can this happen but in the prior art this condition is not apparent to the operator so that he is not prompted to take steps to remedy this undesirable condition.

Referring now to FIGURES 1 to 5 we provide the latch with a slide indicated generally by the reference character 60 having a base 62 and sides 64 and 66 converging towards one end of the base 62 and terminating in blank hook-like elements 68 and 70. We slip the slide 60 over the sides 16 and 18 of the latch adjacent the hook end thereof and provide retaining lugs 72 and 74 on the slides 64 and 66 to retain the slide on the latch.

We employ any suitable means such, for example, as rivets 76 to secure a first spring stop 78 to the base 62 of the slide 60. Stop 78 supports a rod 80 carrying a spring 82. The end of the rod 80 remote from the stop 78 extends through a second spring stop 84 having a base 86 provided with the lateral projections 88 which extend through openings 90 formed in the sides 64 and 66 of the slide 60. It will be seen that the projections 88 are disposed between the base 62 of slide 60 and the sides 16 and 18 of the draw latch.

From the structure thus far described it will readily be apparent that as shown in FIGURE 4 with the latch released spring 82 urges stop 84 to a position at which it is wedged between the converging sides 16 and 18 and it moves the slide to a position at which the blank hook elements cover the recess in the hook 24. We provide the base 62 with an arcuate-depending flange 92 which, in the position of the parts shown in FIGURE 4, is in the path of a wall portion 94 of the socket 38 formed in the handle 36. In this position the flange 92 prevents further movement of the handle 36 relative to the latch. If now the hook 24 cannot move into the eye for any reason handle 36 cannot be moved into the opening and catch 40 cannot be latched so that the operator is made aware of the fact that the hook is not properly positioned.

If the hook 24 is so positioned that it can be moved into the eye 26 then upon continued movement of handle 36 into the opening 58 the hook will engage the eye and begin to draw parts 12 and 14 together. When this action occurs the eye engages the blank hook elements 68 and 70 and it moves into the recess in hook 24. In the course of this movement slide 60 is drawn to a position at which its flange 92 is out of the path of movement of wall portion 94 so that the latch 40 can be moved to cam the ends of pin 46 into engagement with hooks 54.

Referring now to FIGURE 6 we have shown an alternate form of our invention in which the blank hook-like elements, the element 70 of which is shown in the figure, are carried by a slide 96 having rearward extensions 98 which are connected by a pin 100 to a link 102 carried by the pin 22. A spring 104 normally acts on link 102 to move extensions 98 and slide 96 to the right as viewed in FIGURE 6. The end 106 of slide 96 will prevent movement of the handle 36 into the opening 58 until it is moved out of the path of wall portion 94 as eye 26 acts on the blank hook elements 68 and 70.

In operation of the form of our invention shown in FIGURES 1 to 5 and with the latch locked in its operative position as shown in FIGURE 1 the operator inserts a suitable tool into recess 56 to pivot the catch 40 in a counterclockwise direction as viewed in FIGURE 1 to permit handle 36 to be moved out of the opening to move hook 24 to the released position illustrated in FIGURE 3. When the part 12 is to be reassembled on part 14 the operator pushes handle 36 into the opening 58. If the parts are in the correct positions this operation first moves hook 24 to a position within the eye 26 and upon further movement of the handle 36 into opening 58 the hook moves to the right and the eye 26 acts on blank hooks 68 and 70 to move the slide 60 to the left relative to sides 16 and 18 to remove flange 92 from its position in the path of wall portion 94. Movement of the handle 36 into the opening 58 can be continued until ultimately the catch 40 is moved to a position at which the ends of pin 46 snap into position behind hooks 54 to hold the latch parts in their locked position.

If the hook 24 is not so positioned that it can draw on the eye 26 then the handle 36 cannot be moved to its locked position. The operator is thus made aware of the malfunction. He can then manipulate the parts to correct this condition. If this is not possible he knows that repairs must be made. In any event, the condition is apparent so that the possibility of the parts being locked in an inoperative condition is obviated.

The operation of the form of our invention shown in FIGURE 6 is similar to that described above in connection with the form of latch shown in FIGURES 1 to 5.

It will be seen that we have accomplished the objects of our invention. We have provided a safety device for a cowling latch which prevents the latch from being locked in a position at which it will not perform its intended function. Our safety device makes the operator aware of the fact that the parts are not properly engaged even though these parts are concealed from view. The latch is extremely simple in its construction and operation for the desirable result achieved thereby.

It will be understood that certain features and subcombinations are of utility and may be employed without reference to other features and subcombinations. This is contemplated by and is within the scope of our claims. It is further obvious that various changes may be made in details within the scope of our claims without departing from the spirit of our invention. It is, therefore, to be understood that our invention is not to be limited to the specific details shown and described.

Having thus described our invention, what we claim is:

1. A latching assembly including in combination a keeper, a latch arm, means mounting said latch arm for movement from a first position at which said latch arm is out of engagement with said keeper to a latching position at which said latch arm engages said keeper, said mounting means having a latch arm actuator movable between a first position at which said latch is out of engagement with said keeper and a second position at which said latch is in latching engagement with said keeper, means comprising interengageable elements on said arm and on said actuator movable between a first position out of engagement when said arm is in said first position and a second position in engagement when said arm is in said latching position for locking said arm in said latching position, means comprising interengageable means carried by said latch arm and by said latch arm actuator for blocking movement of said locking means interengageable elements to said second position and means responsive to latching engagement of said latch arm with said keeper for rendering said blocking means inoperative.

2. A latching assembly for a pair of separable members including in combination a keeper carried by one of said members, a latch arm, means mounting said latch arm on the other of said members for movement from a first position at which said latch arm is out of engagement with said keeper to a latching position at which said latch arm engages said keeper, a handle, means mounting said handle on said other member for movement from an accessible position to a retracted position, means responsive to movement of said handle from its accessible position to its retracted positon for moving said latch arm from said first position to said latching position, means comprising interengageable elements on said arm and on said handle movable between a first position out of engagement when said arm is in said first position and a second position in engagement when said arm is in said latching position for locking said arm in said latching position, means comprising interengageable means carried by said latch arm and said handle for blocking movement of said locking means interengageable elements to said second position and means responsive to latching engagement of said latch arm with said keeper for rendering said blocking means inoperative.

3. A latching assembly as in claim 2 in which said means responsive to latching engagement of said arm comprises a slide mounted on said arm and adapted to engage said keeper to be actuated thereby as said arm moves to latching position.

4. A latching assembly for a pair of separable members including in combination a keeper carried by one of said members, a drawhook, means mounting said drawhook for movement on the other of said members from a first position at which said hook is out of engagement with said keeper to a second position at which said hook engages said keeper, means for moving said hook from said first position to said latching position, means for locking said drawhook in its latching position, a slide carried by said drawhook, interengageable elements on said drawhook moving means and on said slide for engaging each other to prevent the operation of said locking means, a blind hook on said slide and means for urging said slide to a position at which said blind hook covers said drawhook and at which said interengageable elements are adapted to engage.

References Cited by the Examiner
UNITED STATES PATENTS

| | | | |
|---|---|---|---|
| 1,293,483 | 2/19 | Leland | 292—108 |
| 2,653,044 | 9/53 | Tatom | 292—108 |
| 2,703,431 | 3/55 | Vickers | 292—108 |
| 2,712,955 | 7/55 | Andrews | 292—108 |
| 3,005,065 | 10/61 | Jellies | 200—61.62 |
| 3,070,395 | 12/62 | Morrison et al. | 292—113 |

M. HENSON WOOD, Jr., *Primary Examiner.*

ALBERT H. KAMPE, *Examiner.*